3,155,338
CAMERA SPOOL
Philip E. Uterhart, Park Ridge, Ill., assignor to Bell and Howell Company, Chicago, Ill., a corporation of Illinois
Filed Mar. 25, 1963, Ser. No. 267,691
11 Claims. (Cl. 242—74)

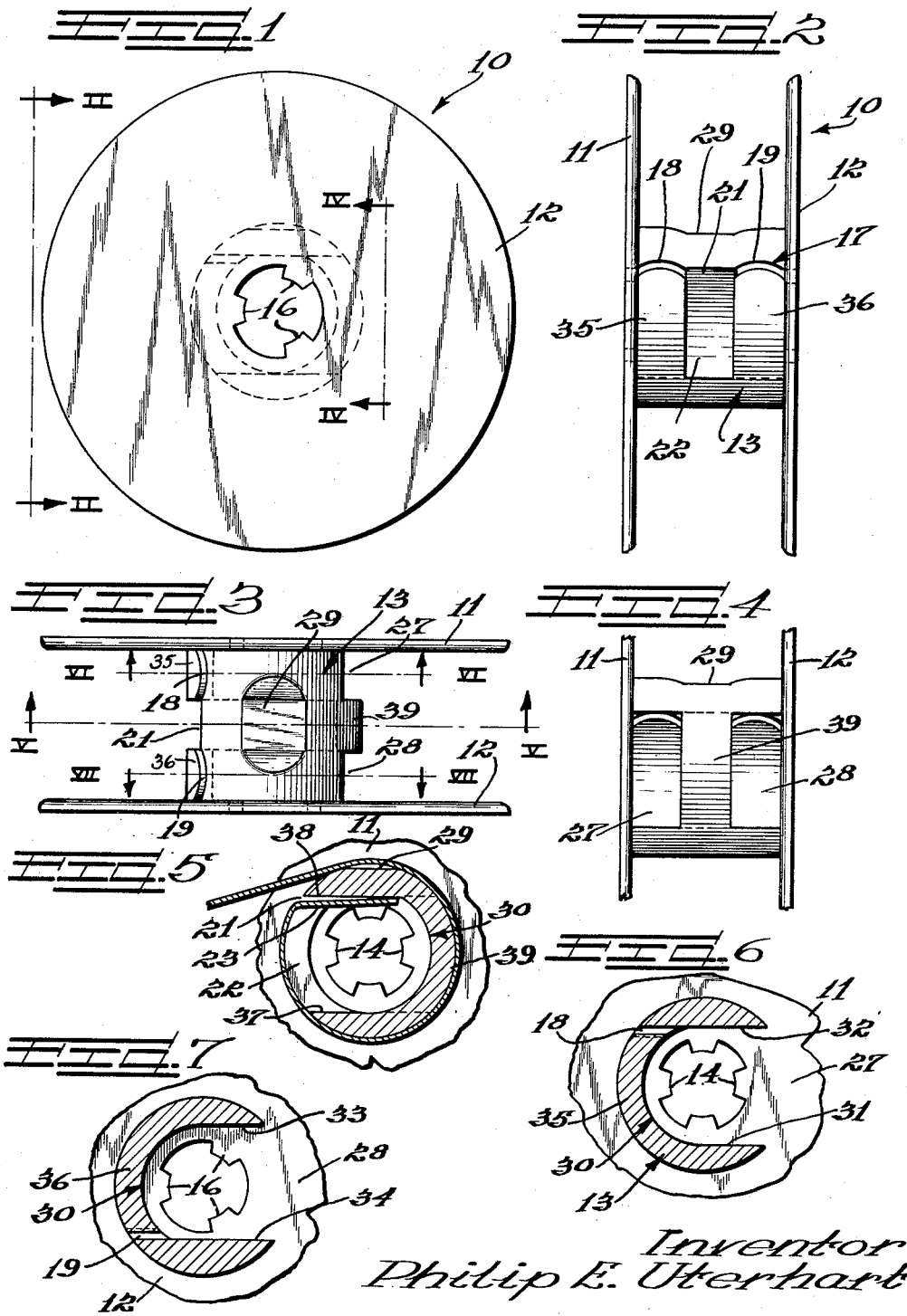

The present invention relates to an improved spool construction particularly suitable for use in motion picture cameras although it will be recognized that the spool assembly has general applicability not only to motion picture film handling devices but also to magnetic tape and the like.

The spool construction of the present invention is intended to replace the conventional metal spools now being employed in motion picture cameras. The configuration of the spool is such that it lends itself to manufacture from plastic materials, so that the cost of the spool is markedly reduced. Furthermore, the configuration of the spool provides a locking means into which the end of the film is readily inserted and which provides a positive grip on the end of the film while the film is being wound up on the spool.

Basically the spool which is constructed in accordance with my invention comprises a generally cylindrical hub and a pair of flanges formed integrally therewith at the opposed ends of the hub. In the embodiment of my invention illustrated in the appended drawings, the hub comprises a pair of hub-wall portions which extend between the spaced flanges and a plurality of bands which extend in a circumferential direction from the hub-wall portions to define a cylindrical surface upon which film can be wrapped. It will be observed that slots are formed within the hub at points diametrically opposite the hub slots and that these slots are complementary with the bands in the sense that they describe equal arcs. As a result of this formation a core can be inserted through each of the slots to form the inner surface of the bands positioned opposite each of the slots.

It is therefore an object of this invention to provide a film spool of one piece molded construction for use in motion picture cameras.

Another object of the present invention is to provide an improved spool construction particularly designed for use in motion picture cameras.

Another object of the invention is to provide an improved spool construction which can be readily and economically fabricated from inexpensive plastic materials.

A further object of the present invention is to provide a spool construction which provides an integrally formed locking means on the hub for securing the end of the film during winding of the film on the hub.

Other objects and features of the present invention will be apparent to those skilled in the art from the following detailed description of the attached sheet of drawings which illustrate a preferred embodiment of the invention.

In the drawings:

FIGURE 1 is a view in elevation of a spool construction embodying the features of the present invention;

FIGURE 2 is a view taken substantially along the line II—II of FIGURE 1;

FIGURE 3 is a plan view of the spool illustrated in FIGURE 1;

FIGURE 4 is a fragmentary cross-sectional view of the spool assembly taken along the line IV—IV of FIGURE 1:

FIGURE 5 is a cross-sectional view taken along the line V—V of FIGURE 3;

FIGURE 6 is a cross-sectional view taken along the line VI—VI of FIGURE 3; and

FIGURE 7 is a cross-sectional view taken along the line VII—VII of FIGURE 3.

As shown in the drawings:

In FIGURES 1 and 2, references numeral 10 indicates generally a spool construction produced according to the present invention and including a pair of flanges 11 and 12 connected by means of a hollow substantially cylindrically shaped hub 13. The particular spool construction shown in the drawings is designed for an eight millimeter camera wherein the film is run through the camera in one direction and then in the opposite direction, exposing one half of the film at a time. In line with conventional practice, the flange 11 is accordingly provided with indexing lugs 14 (FIG. 5) spaced 90° apart, and the flange 12 is provided with three indexing lugs 16 spaced 120° apart.

In accordance with the present invention, the hub 13 is provided with a slot 17 (FIGURE 2) composed of a curved portion 18 adjacent the flange 11 and a curved portion 19 adjacent the flange 12, the two curved portions 18 and 19 being joined by a centrally disposed relatively straight slot portion 21. The hub 13 is also provided with a peripheral slot 22 which merges with the straight slot portion 21. It should be borne in mind that the term "peripheral slot" is employed herein to designate a slot which is formed in the hub in a circumferential direction about a portion of the surface of revolution of the main body of the hub itself.

The slot 17 extends through the hub 13 in a non-radial direction, and more specifically is formed so that when the end of the film is inserted through this non-radial slot 17, it is brought in close proximity with flat portion 38 of the inner wall 30 of the hollow cylindrical hub 13, as best illustrated in FIGURE 5 of the drawings. This figure illustrates an end portion 23 of a film 24 being received through the non-radial slot 17 so that portion 23 rests against inner wall 30 and is then trained about the outer periphery of the hub 13. It will be noted from FIGURE 5 that the disposition of the non-radial slot 17 is such that the end portion 23 of the film 24 is received in an out of the way position with respect to the centrally disposed aperture of the spool assembly through which the spindle of the camera is arranged to be received.

As best seen in FIGURES 3 and 4 of the drawings, the hub 13 is also provided with a pair of peripherally extending slots 27 and 28 on the surface of the hub which are diametrically opposed to the surface in which the slot 22 is provided. It is noted that slots 22, 27, and 28 are provided to facilitate molding the spool in one piece.

To more clearly explain the molding technique required to mold the instant spool, it will be assumed that one spool has been formed and the cores are merely being reinserted in that spool to demonstrate what has been accomplished. The hub configurations shown in FIGURES 5, 6, and 7 are of particular interest in this explanation. Specifically, a first molding core (the width of slot 27) enters slot 27 and protrudes rearwardly between flat portions 31 and 32 (see FIGURE 6) of the inner wall 30, until the core comes against the inner surface of hub portion 35 (see FIGURES 2 and 6). A small tip of this first molding core extends through slot 18 to the outer surface of hub 13.

Similarly, a second molding core enters slot 28 and protrudes rearwardly between flat portions 33 and 34 (see FIGURE 7) of the inner wall 30 until the core comes against the inner surface of hub portion 36 (see FIGURES 2 and 7). A small tip of this second molding core extends through slot 19 to the outer surface of hub 13. Notice that the inner surface of slot 18 and flat portions 31 and 32 are all parallel to the direction of movement of the first molding core, and the inner surface of slot 19 and flat portions 33 and 34 are all parallel to the direction of movement of the second molding core, so that these cores may be freely removed after molding.

A third molding core enters slot 22 and protrudes rearwardly between flat portions 37 and 38 (see FIGURE 5) of the inner wall 30 until the core comes against the inner surface of hub portion 39 (see FIGURES 3, 4 and 5). Thus it is observed that the first and second cores are parallel to each other and enter hub 13 from one direction. The third molding core enters hub 13 from the opposite direction as the first and second cores.

In addition, flattened portions 29 (see FIGURES 3 and 5) are provided on the outer surfaces of the hub 13 adjacent the flat portions 38, 32 and 34, to provide a hub wall of substantially uniform thickness, to prevent excessive warpage and the like in the finished molding such as might result if different parts of the spool were of different thicknesses and thus cooled at different rates.

From the foregoing, it is seen that the spool employed in the present invention can be conveniently manufactured in one piece. This represents a substantial savings, since one piece molded products can be rapidly made from inexpensive plastic material.

The configuration of non-radial slot 17 in the hub makes it simple to insert the film end 23 through the hub into close proximity with the flat portion 38 (and flat portions 32 and 34 on either sides thereof) and on the inner wall 30 of the hub 13. The grip provided by the bending of the film and forcing it through the slot provides a sufficiently firm anchor for the film end 23 to enable the remainder of the film to be wound about the periphery of hub 13.

It should be evident that various modifications can be made to the described embodiments without departing from the scope of the present invention.

I claim as my invention:

1. An integral spool for motion picture film comprising a hollow hub having flanges centrally mounted at opposed ends thereof, said hub having at least one hub wall portion extending between said flanges and a plurality of circumferentially extending bands forming extensions of said hub wall portion, wherein slots complementary to said bands are formed within said hub at points diametrically opposed to each of said bands and wherein at least one of said plurality of bands is positioned on the opposite side of said hub from at least one other of said plurality of bands, at least one of said bands having an axially extending slot therein to permit film to enter said hollow hub.

2. The film spool of claim 1 wherein said wall portion and said bands define inner and outer peripheral surfaces, the inner peripheral surface defining one side of said axially extending slot being substantially flat so as to permit film entering said slot to normally lie against said flat surface.

3. A spool constructed in accordance with claim 1, having means on said hub adjacent said axially extending slot for gripping a strip of film.

4. A spool construction for motion picture films comprising a pair of flanges, and a hollow hub disposed between said flanges, said hub having a non-radial slot therein including curved portions adjacent each of said flanges, and a straight slot portion extending between said curved portions, and said hub also having a peripheral slot therein merging into said straight slot portion.

5. A spool construction for motion picture films comprising a pair of flanges, and a hollow hub disposed between said flanges, said hub having a non-radial slot therein including curved portions adjacent to each of said flanges, and a straight slot portion extending between said curved portions, the angular disposition of said slot being such that a film introduced through said slot extends in close proximity to the inner wall of said hollow hub.

6. A spool construction for motion picture films comprising a pair of flanges, and a hollow hub disposed between said flanges, said hub having a non-radial slot therein, a first peripheral slot therein merging with said non-radial slot and a pair of peripheral slots opposite said first peripheral slot, each of said pair lying adjacent one of said flanges.

7. A spool construction for motion picture films comprising a pair of flanges, and a hollow hub integrally molded with and disposed between said flanges, said hub having a non-radial slot therein, a first peripheral slot therein merging with said non-radial slot, and a pair of peripheral slots opposite said first peripheral slot, each of said pair lying adjacent one of said flanges.

8. A spool construction for motion picture films comprising a pair of flanges, and a hollow hub integrally molded with and disposed between said flanges, said hub having a non-radial slot therein, said hub having a flat portion on the inner wall thereof, said slot being disposed to direct a piece of film inserted therethrough along the inner wall of said hollow hub and against said flat portion, whereby said piece of film remains away from said axial spindle aperture.

9. An integrally molded one-piece spool construction for motion picture film comprising a pair of flanges, and a hollow hub integrally molded with and disposed between said flanges, said hub having a non-radial slot therein for gripping a piece of film inserted therein, a first peripheral slot in said hub merging with said non-radial slot, and a pair of peripheral slots opposite said first peripheral slot, each of said pair lying adjacent one of said flanges, said peripheral slots so positioned as to facilitate one-piece molding of said spool.

10. An integrally molded one-piece spool construction for motion picture film comprising a pair of flanges, and a hollow hub integrally molded with and disposed between said flanges, said hub having a first flat portion on the inner surface thereof, a non-radial slot in said hub at one edge of said first flat portion, said non-radial slot for gripping a piece of film inserted therein, a primary peripheral slot in said hub, one end of which merges with said non-radial slot, a second flat portion on the inner surface of said hub located adjacent the other end of said primary slot, said second flat portion positioned directly opposite said first flat portion and parallel thereto, and a pair of peripheral slots on the opposite side of said hub from said primary slot and located peripherally between said first and second flat portions, each of said pair lying adjacent one of said flanges, said first and second flat portions so positioned that the perpendicular distance therebetween defines the greatest interior dimension within said hub perpendicular to said flat portions.

11. An integrally molded one-piece spool construction for motion picture film comprising a pair of flanges, and a hollow hub integrally molded with and disposed between said flanges, said hub having a first flat portion on the inner surface thereof, a non-radial slot in said hub at one edge of said first flat portion, said non-radial slot including a curved portion adjacent each said flange, and a straight slot portion extending between said curved portions, a primary peripheral slot in said hub, one end of which merges with said non-radial slot, a second flat portion on the inner surface of said hub located adjacent the other end of said primary slot, said second flat portion positioned directly opposite said first flat portion and parallel thereto, and a pair of peripheral slots on the opposite side of said hub from said primary slot and located peripherally between said first and second flat portions, each of said pair lying adjacent one of said flanges, said first and second flat portions so positioned that the perpendicular distance therebetween defines the greatest interior dimension within said hub perpendicular to said flat portions.

References Cited in the file of this patent

UNITED STATES PATENTS 2,778,581  Lorenz _____ Jan. 22, 1957
3,092,348  Corsan _____ June 4, 1963